(12) United States Patent
Docter et al.

(10) Patent No.: US 6,797,022 B1
(45) Date of Patent: Sep. 28, 2004

(54) AUTOTHERMIC REFORMING REACTOR

(75) Inventors: Andreas Docter, Esslingen (DE); Uli Roeltgen, Muellheim (DE); Norbert Wiesheu, Guenzburg (DE)

(73) Assignee: DaimlerChrysler AG, Stuttgart (DE)

(*) Notice: Subject to any disclaimer, the term of this patent is extended or adjusted under 35 U.S.C. 154(b) by 233 days.

(21) Appl. No.: 10/089,713

(22) PCT Filed: Sep. 28, 2000

(86) PCT No.: PCT/EP00/09477

§ 371 (c)(1),
(2), (4) Date: Aug. 5, 2002

(87) PCT Pub. No.: WO01/24922

PCT Pub. Date: Apr. 12, 2001

(30) Foreign Application Priority Data

Oct. 2, 1999 (DE) .......................................... 199 47 755

(51) Int. Cl.$^7$ ........................... B01J 12/00; H01M 8/06; C01B 3/38
(52) U.S. Cl. ...................................... 48/127.9; 422/198
(58) Field of Search ............................ 48/61, 62 R, 75, 48/63, 64, 89, 102 R, 105, 107, 102 A, 110, 93–95, 119, 120, 127.9, 128, 197 R, 198.1, 198.2, 198.3, 198.7, 204, 211–213, 214 R, 215, 214 A; 422/188–191, 193–195, 198, 207, 211, 217, 220, 222, 224, 236, 239

(56) References Cited

U.S. PATENT DOCUMENTS

| 2,664,402 | A | | 12/1953 | Cromeans .................. 252/373 |
| 4,203,906 | A | | 5/1980 | Takada et al. ........... 260/346.4 |
| 4,822,521 | A | | 4/1989 | Fuderer ...................... 252/376 |
| 5,030,661 | A | * | 7/1991 | Lywood ...................... 518/704 |
| 5,358,696 | A | | 10/1994 | Jahnke ........................ 423/650 |
| 6,245,303 | B1 | * | 6/2001 | Bentley et al. ............. 422/193 |
| 6,436,354 | B1 | * | 8/2002 | Priegnitz et al. ............ 422/198 |
| 6,641,625 | B1 | * | 11/2003 | Clawson et al. ........... 48/127.9 |

FOREIGN PATENT DOCUMENTS

| DE | 19711044 | 9/1998 |
| EP | 0967005 | 12/1999 |

\* cited by examiner

Primary Examiner—Samuel M. Heinrich
(74) Attorney, Agent, or Firm—Davidson, Davidson & Kappel, LLC

(57) ABSTRACT

The invention relates to an autothermic reforming reactor, comprising an endothermic reaction zone, in which the reforming reaction takes place; an exothermic reaction zone, in which the energy is released which is required for the reforming reaction; a quench zone connected downstream of the reaction zones for the rapid cooling of the reactor gas volume flow. According to the invention, the endothermic reaction zone and the quench zone are separated by a gas permeable heat shield (HS), whereby the heat shield (HS) comprises thermal insulation (IS) for thermally insulating the endothermic reaction zone and quench zone, in addition to a thermal radiator (STR) which faces the endothermic reaction zone and radiates the thermal energy which has been absorbed from the reactor gas volume flow.

10 Claims, 6 Drawing Sheets

Fig. 5
a) HS
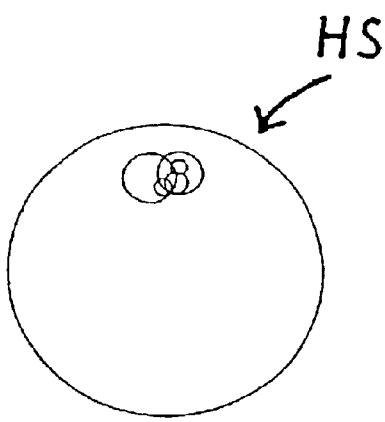
b)
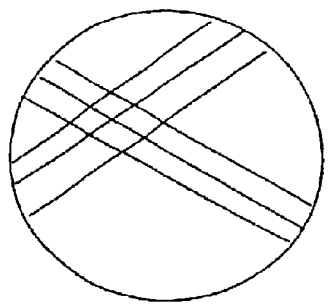
c)
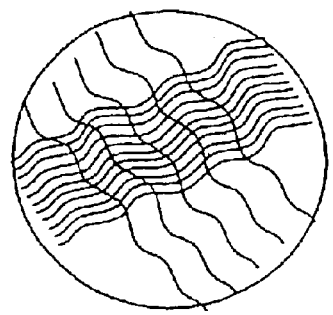
d)
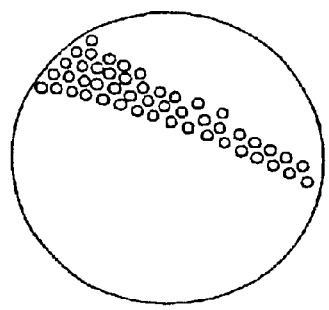

AUTOTHERMIC REFORMING REACTOR

BACKGROUND OF THE INVENTION

The present invention relates to an autothermic reforming reactor.

During the operation of fuel cells having polymer membranes, briefly called PEM fuel cells, in particular for mobile applications, it is possible to produce a hydrogen-rich gas from a liquid raw fuel by reforming liquid hydrocarbons, for example, gasoline or Diesel fuel.

This reaction can advantageously be carried out in an autothermic reactor. There inside, energy is released by an exothermic combustion which is used for heating the endothermic reforming reaction. In the ideal case, the exothermic reaction zone is superimposed over the endothermic reaction zone. However, it is also possible for the exothermic reaction to be arranged upstream of the endothermic reaction. In the endothermic reaction zone, the charged water/air/hydrocarbon mixture is converted to an $H_2$-rich gas which also contains CO in addition to $CO_2$. To prevent the CO gas in the gas mixture from reacting back to elemental carbon (soot) at the end of the reactor, it is required for the gas mixture to be quickly cooled down to a low temperature level. This is achieved by adding water and is referred to as quenching. For the case of the partial oxidation of hydrocarbons, this process is described, for example, in U.S. Pat. No. 5,358,696 or in U.S. Pat. No. 2,664,402.

Due to the quenching process, a temperature gradient which corresponds to the cool down arises in the reactor. This is undesirable because the accompanying heat loss produces too low a temperature in the rear region of the endothermic zone. This temperature is decisive for the gas composition since the thermodynamic equilibrium of the reforming reaction is temperature dependent.

German Patent Application DE 197 11 044 A1 describes a reactor for sewage sludge incineration. It is aligned vertically, the combustion zone for incinerating the sewage sludge being situated in the lower region, and the combustion gases, which rise within the reactor, being used for drying the sewage sludge, which enters the reactor from above. Located between the drying zone and the combustion zone is a solid-state radiator having radially arranged, inclined blades similar to a fan wheel. The blades are inclined by 30° to the flow direction of the combustion gases. When passing through the solid-state radiator, the combustion gases give off part of their heat to the solid-state radiator. A part of the absorbed energy is reflected back into the combustion zone as solid-state radiation.

SUMMARY OF THE INVENTION

An object of the present invention is to optimize the temperature distribution in the autothermic reactor in such a manner that the reaction zones are thermally decoupled from the quench zone in the best possible manner. A cool down in the rear region of the endothermic zone should be prevented; however, as good as possible an energy feedback into the upstream endothermic zone should be achieved. In this context, the arising loss of pressure of the gas volume flow should be as low as possible.

This objective is achieved by the autothermic reactor according to Patent Claim 1. Advantageous embodiments of the present invention are the subject matter of subclaims.

a thermal insulation for thermally insulating the endothermic reaction zone and the quench zone, a thermal radiator for radiating the thermal energy absorbed from the effluent reactor gas volume flow. Its surface faces the endothermic reaction zone. The radiant power increases with the fourth power of the surface temperature in accordance with the Stefan-Boltzmann law. The hotter the gas temperature, the hotter is the surface of the heat shield and the higher is the energy radiated in the direction of the endothermic reaction zone.

Thus, mainly the following heat transfer mechanisms are of importance for the mode of operation of the temperature-stabilized reactor according to the present invention:

heat transfer from the gas volume flow to the heat shield; here, above all, the convective heat transfer through forced convection is of importance. In this connection, it is advantageous to produce a turbulent flow. This turbulent flow can be achieved by a suitable geometric design of the heat shield. Moreover, the heat shield geometry can be designed in such a manner that the heat flow to the surface of the thermal radiator is optimized.

radiant heat transfer from the heat shield back to the reforming catalyst located in the reaction zone. Typical temperatures during the execution of the reforming reaction with gasoline or Diesel fuel lie in the range of about 900° C. At these temperatures, the radiated power is already relatively high. Via the surface type (ideally having the characteristic of a blackbody radiator) as well as the surface quality, it is possible to attain maximum radiation efficiency.

Thus, a very good thermal insulation of the quench zone from the autothermic region of the reactor is achieved using the heat shield according to the present invention. The endothermic reaction zone can be maintained at operating temperature without being influenced by the temperature drop in the quench zone.

At the same time, an energy feedback is attained in that the heat of the gas volume flow which has been absorbed by the heat shield is reflected back into the endothermic zone. Therefore, the heat losses caused by the effluent gas mass flow can be considerably reduced.

Moreover, the heat shield according to the present invention, advantageously acts as an energy store during load changes, as will be explained in the following:

In a reactor, one can essentially distinguish between two types of heat losses:

wall losses: heat losses to the surroudings through the reactor insulation and via the reactor surface;

gas volume flow losses: heat losses caused by the effluent gas mass flow and the gas temperature. The gas volume flow losses are dependent on the gas mass flow, the heat-absorption capacity of the flowing gas mixture, and on the temperature gradient.

During load changes, the exothermic energy release varies in proportion to the load change. Since the wall losses depend substantially on the inside temperature but the gas volume flow losses vary in proportion to the load, the proportions of the types of loss shift accordingly during load change. The lower the load, the higher is the proportion of the wall losses, and the higher the load, the higher is the proportion of the volume flow losses.

Under the described conditions, the beat shield according to the present invention can be used as a heat buffer for stabilizing the operating temperature of the reactor. During a downward change in load, it releases its previously absorbed energy in a time-delayed manner, depending on its heat-absorption capacity, thus slowing down the cooling.

During an upward change in load, the proportionally increasing volume flow loss is reduced through the heat absorption of the heat shield.

Moreover, a more constant control of the quenching is attained via this damping process. This also permits a more uniform supply to the shift reaction for removing CO arranged downstream of a reactor.

The reforming catalyst according to the present invention can be used, in particular, for reforming hydrocarbons such as gasoline or Diesel fuel.

The reforming reactor according to the present invention can be used, in particular, in a fuel-cell powered motor vehicle for supplying the fuel cell with hydrogen.

BRIEF DESCRIPTION OF THE DRAWINGS

The present invention will be explained in greater detail in the light of exemplary embodiments with reference to drawings.

FIGS. 5,6 depict further concrete embodiments of the heat shield according to the present invention.

DETAILED DESCRIPTION

Figure 1:
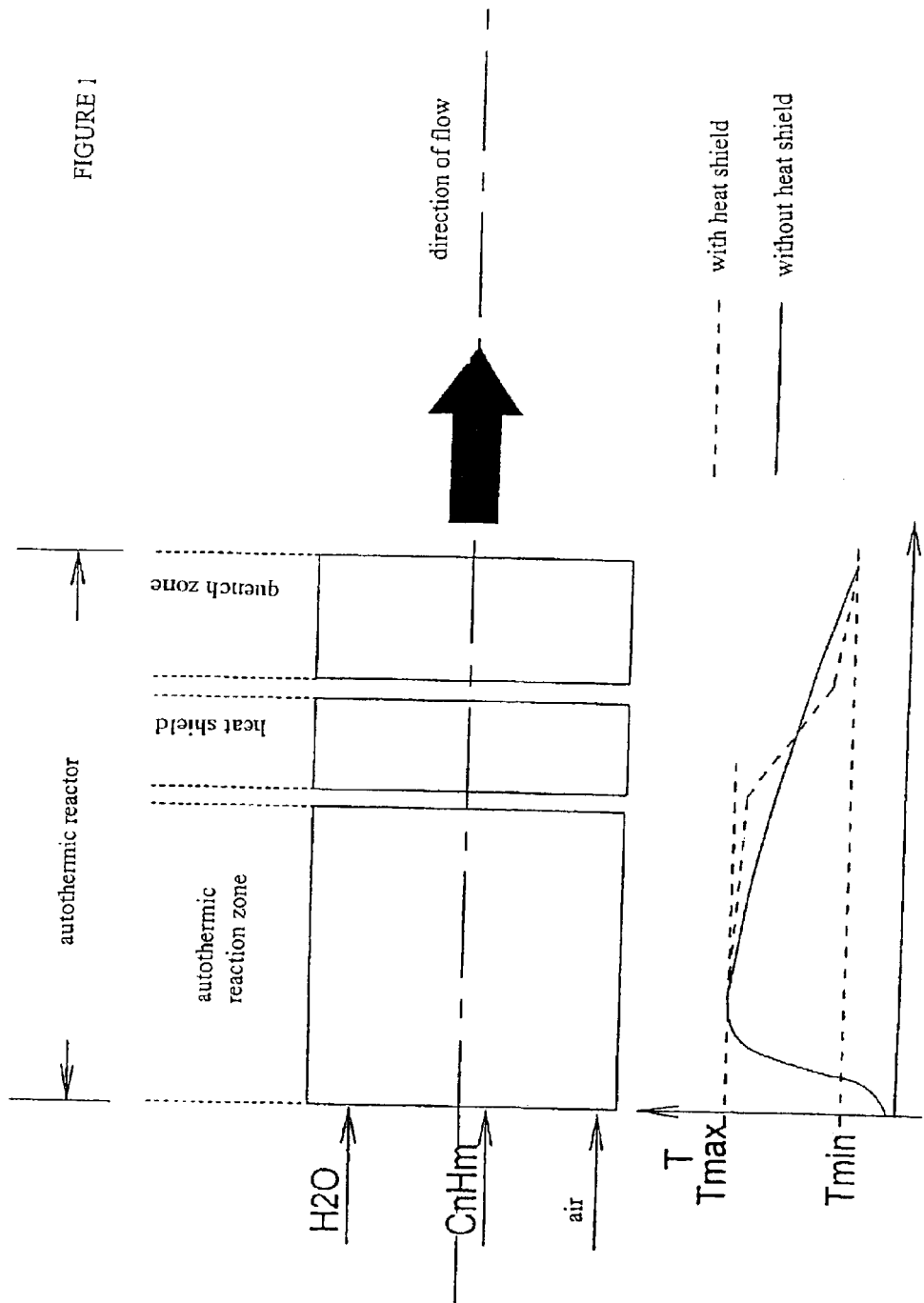
FIG. 1 is a schematic representation of a reactor according to the present invention.

FIG. 1 is a schematic representation of an autothermic reforming reactor according to the present invention. It includes the autothermic reaction zone in which the exothermic reaction for releasing energy as well as the endothermic reforming reaction take place. The charged hydrocarbons as well as air and $H_2O$ are converted to an $H_2$-rich, CO-containing gas mixture therein. Downstream of the autothermic reaction zone is arranged the quench zone in which the gas mixture, upon passage through the gas-permeable heat shield, is quickly cooled down to a low temperature level by adding a liquid, usually water. In this variant, the heat shield according to the present invention is positioned transversely to the flow direction of the gas volume flow. It is advantageously configured in such a manner that it has as large a surface area as possible. The heat shield according to the present invention extends over the entire cross-section of the reactor so that the reactor is structurally divided into two chambers.

FIG. 1 additionally shows a plot of a temperature distribution inside the reactor along the flow direction. In this context, the broken lines mark the values in a reactor according to the present invention, the solid lines indicate the values in a conventional reactor. It is discernible that in the reactor according to the present invention, there is a marked temperature gradient in the region of the heat shield so that the quench zone is thermally well decoupled from the reaction zones. In contrast, the conventional reactor features a continuous temperature gradient over the entire length of the reactor. Because of this, heat losses occur in the rear region of the reaction zone (as viewed in the direction of flow), involving the disadvantages explained in the introductory description.

Figure 2:
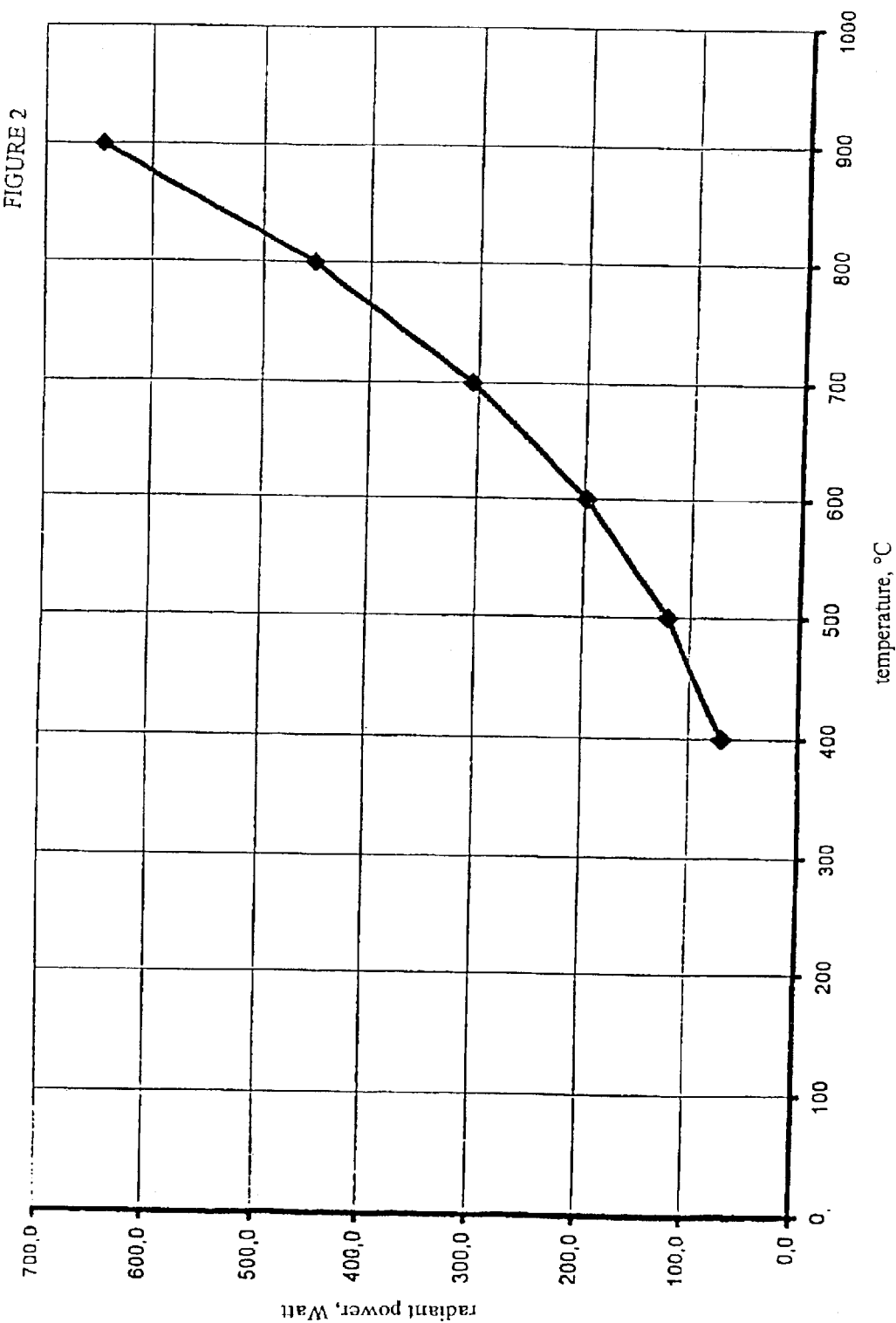
FIG. 2 depicts the radiant power (Watt) of a heat shield according to the present invention as a function of the temperature (° C.)

FIG. 2 shows the radiant power of a heat shield according to the present invention for a specific, exemplary diameter. As is discernible in the drawing, the radiant power increases in proportion to the fourth power of the temperature in accordance with the Stefan-Boltzmann law.

Figure 3:
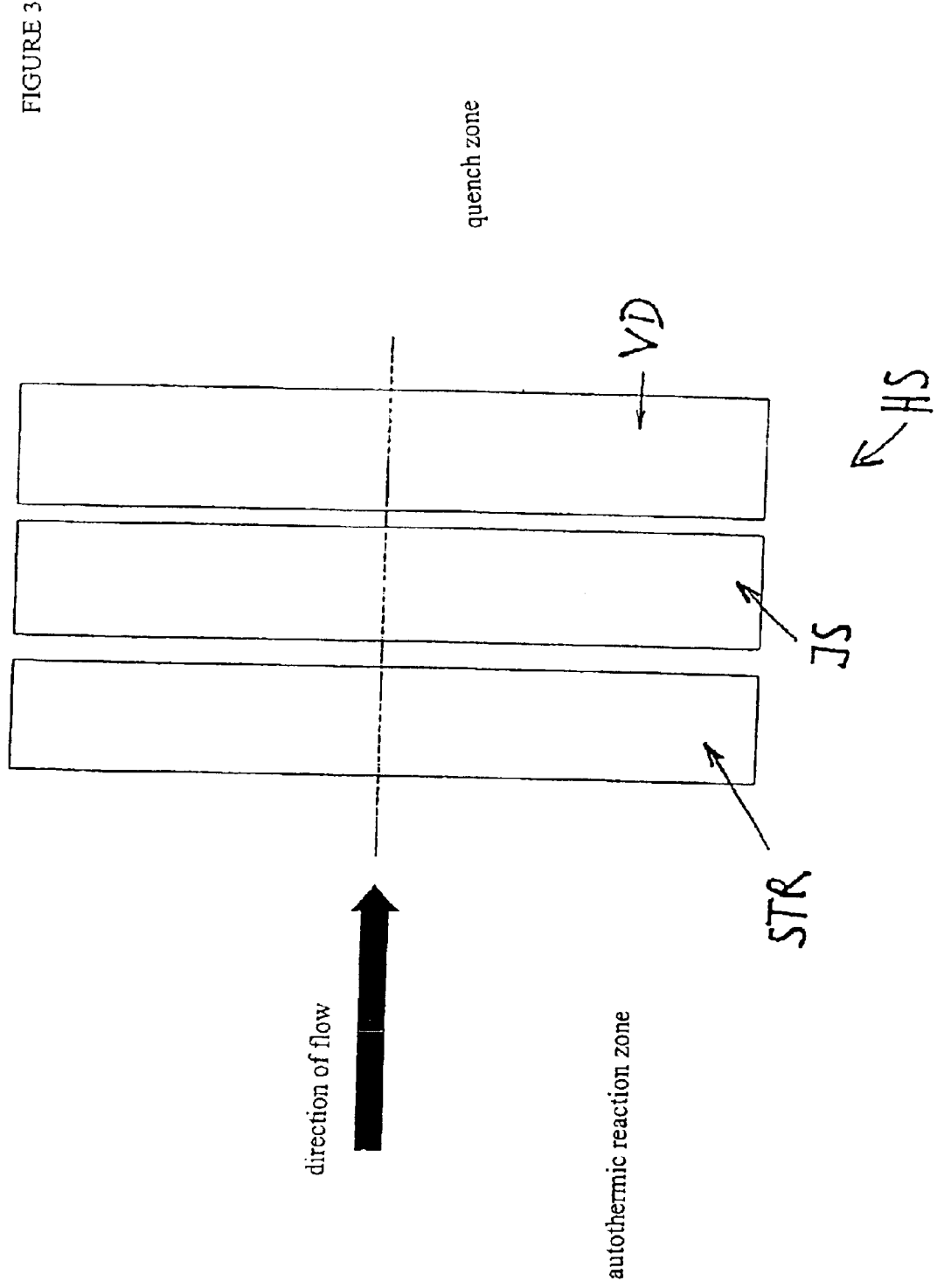
FIG. 3 is a schematic representation of an embodiment of the heat shield according to the present invention.

FIG. 3 is a schematic representation of an embodiment of the heat shield according to the present invention. Heat shield HS is arranged in the reactor gas volume flow between the autothermic reaction zone and the quench zone. In this variant, heat shield HS includes the following elements which are arranged side-by-side in a layer-like manner:

A thermal radiator STR made of a foam of metal or ceramics. It faces the autothermic reaction zone and reflects the heat which has been transferred by convection from the reactor gas volume flow to the heat shield back into the reaction zone.

Thermal insulation IS made of a thermally insulating pourable ceramic compound or a preformed ceramic part. The thermal insulation can have a foam-like structure.

An evaporator structure VD made of a metal foam having as large as possible a surface area. It serves to support the quenching of the reactor gas volume flow in that the water which has been added, for example, injected or sprayed in, for cooling is evaporated at its surface as fast as possible.

Figure 4:
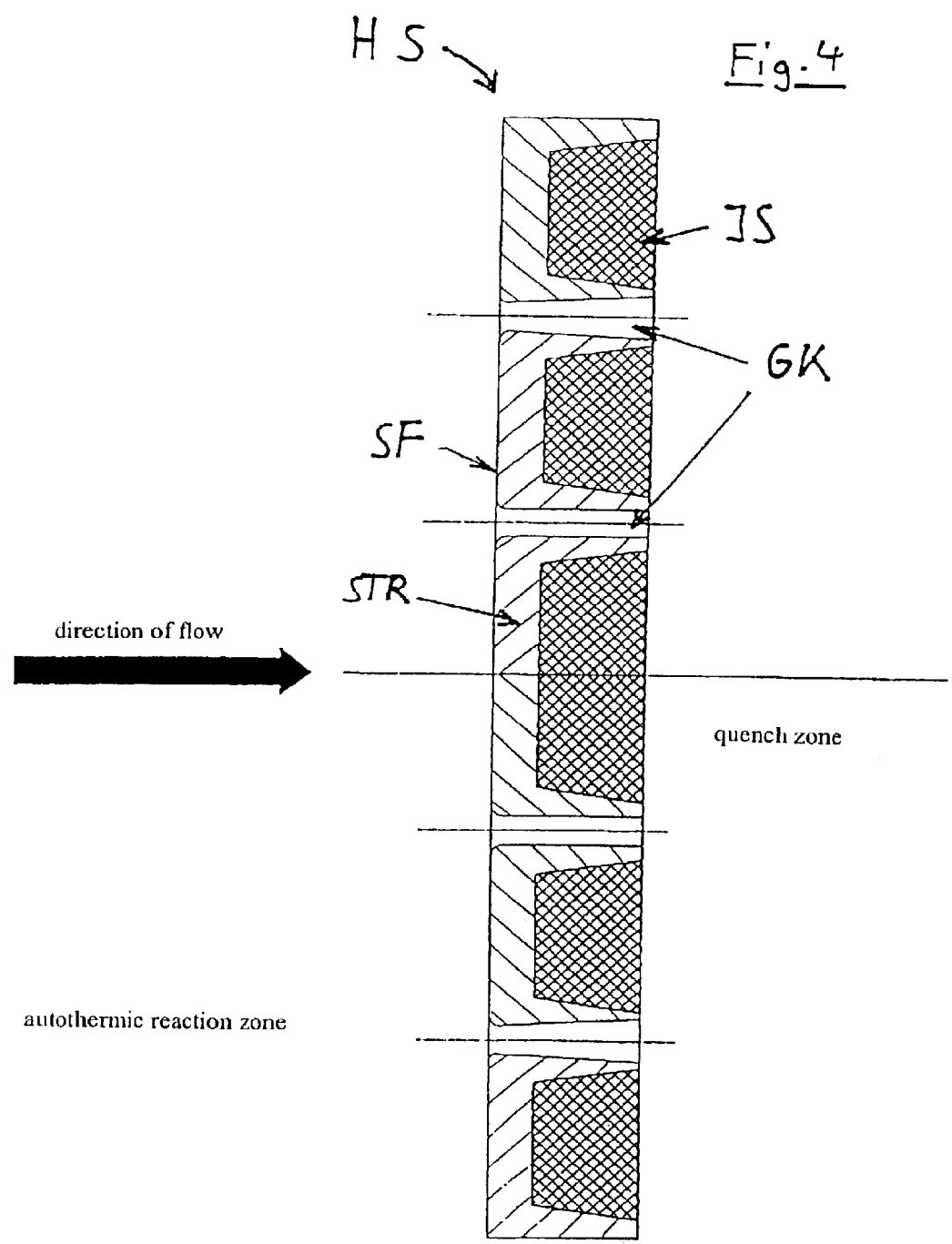
FIG. 4 shows a concrete embodiment of the heat shield according to the present invention.

FIG. 4 shows a concrete embodiment of heat shield HS according to the present invention. It includes thermal radiator STR whose surface facing the reaction zone serves as radiant surface SF via which the heat which has been transferred from the gas volume flow to heat shield HS is reflected back into the reaction zone as radiant energy. Moreover, there exists a thermal insulation IS.

Heat shield HS is structurally designed in such a way that as high a radiation as possible is attained in countercurrent direction and that, at the same time, as good as possible a thermal insulation is attained with respect to the quench zone arranged downstream in the direction of flow. For a good heat transfer from the gas volume flow to heat shield HS, it is advantageous to produce a turbulent flow, for example, through a suitable selection of the flow cross-section. In the variant shown, flow channels GK for the reactor gas volume flow have either a conical or a cylindrical shape. The walls of flow channels GK are formed by thermal radiator STR. In this manner, the heat flow to the radiation-active surface SF of thermal radiator STR is optimized. In this variant, thermal insulation IS is thus composed of a plurality of individual unconnected regions.

Figure 6:
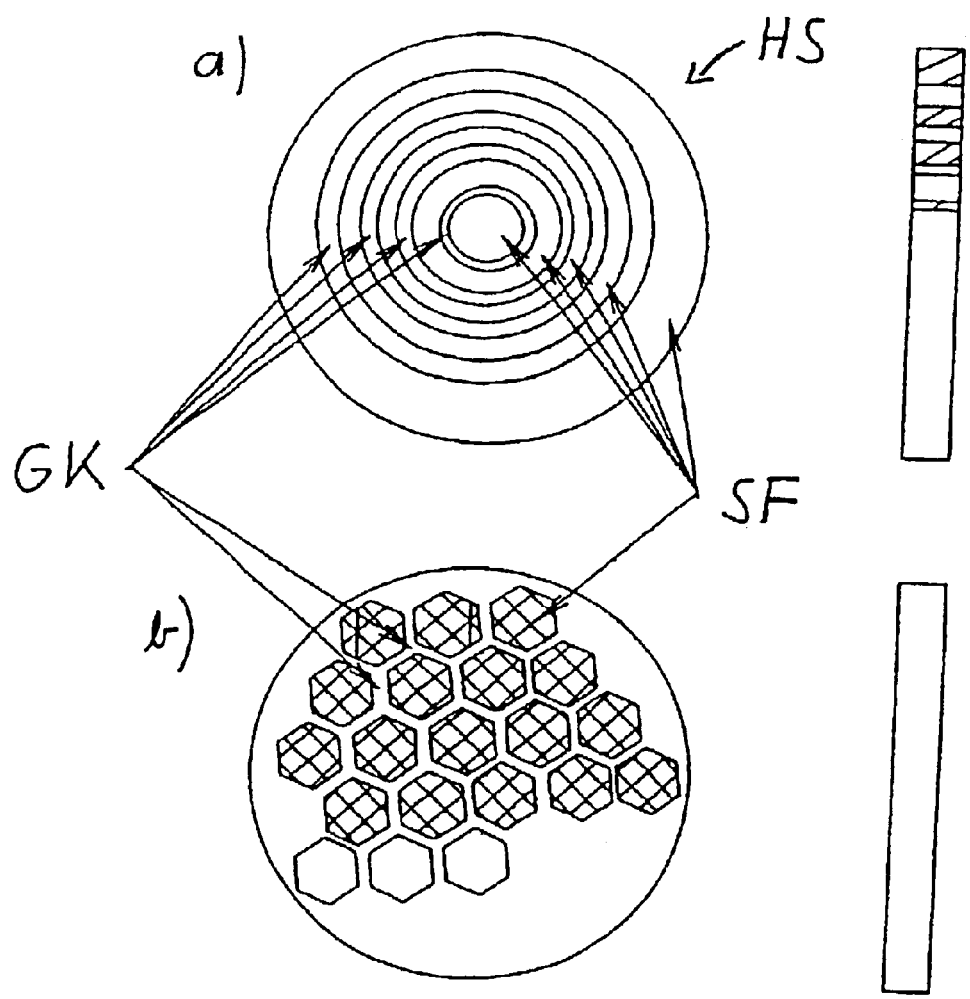

FIGS. 5 and 6 show further embodiments of heat shield HS according to the present invention. In each case, the thermal radiator is represented as the outermost layer of the heat shield. Each variant is shown both in a top view and in a cross-section. The upper figure, FIG. 5a, depicts a first variant of the thermal radiator as a ceramic or metal foam. FIG. 5b shows a further variant in which the thermal radiator is designed as a cross-channel structure, for example, according to German Patent Application DE 43 34 981 A1. Finally, FIG. 5c and FIG. 5d show variants made of wire grating structures or perforated plates.

FIG. 6 depicts variants of heat shield HS according to the present invention, featuring different gap structures as flow channels GK for the gas volume flow. FIG. 6a shows a gap structure composed of a plurality of concentric ring gaps. FIG. 6b shows a honeycomb-like gap structure. In this connection, the "webs" between the "honeycombs" form the gaps whereas the "honeycombs" constitute surface SF of the thermal radiator.

Particularly suitable materials for heat shield HS are those meeting the following requirements:

minimum pressure loss, maximum surface area, in particular, perpendicularly to the direction of flow, temperature resistance, resistance to thermal shocks, resistance to scaling.

The latter property is relevant because a breakthrough of $O_2$ can occur in the case of inhomogeneous mixture formation in the reaction zone.

What is claimed is:

1. An autothermic reforming reactor, comprising:

an endothermic reaction zone in which a catalyst is provided for endothermic reforming of a raw fuel;

an exothermic reaction zone in which energy required for the endothermic reforming reaction is released by an exothermic reaction;

a quench zone arranged downstream of the two reaction zones with respect to a direction of a reaction gas volume flow, the reaction gas volume flow being cooled in the quench zone by a liquid; and a gas-permeable heat shield separating the endothermic reaction zone and the quench zone, the heat shield including a thermal insulator for thermally insulating the endothermic reaction zone and the quench zone and a thermal radiator facing the endothermic reaction zone for radiating thermal energy absorbed from the reactor gas volume flow back into the endothermic reaction zone.

2. The autothermic reforming reactor as recited in claim 1 wherein the heat shield further includes an evaporation structure on a side facing the quench zone.

3. The autothermic reforming reactor as recited in claim 2 wherein the heat shield includes a metal foam.

4. The autothermic reforming reactor as recited in claim 1 wherein the exothermic reaction zone is arranged upstream of the endothermic reaction zone.

5. The autothermic reforming reactor as recited in claim 1 wherein the exothermic reaction zone is superimposed over the endothermic reaction zone.

6. The autothermic reforming reactor as recited in claim 1 wherein the heat shield includes flow channels having walls formed by the thermal radiator.

7. The autothermic reforming reactor as recited in claim 1 wherein at least one of the thermal radiator and the thermal insulation includes a cross-channel structure, wire grating structure or perforated plate.

8. The autothermic reforming reactor as recited in claim 1 wherein the thermal radiator includes a foamed structure of metal or ceramics or of a metal/ceramic compound.

9. The autothermic reforming reactor as recited in claim 1 wherein the thermal insulation includes a foamed ceramic structure.

10. The autothermic reforming reactor as recited in claim 1 wherein at least one of the thermal radiator and the thermal insulation includes gap structures in a form of concentric ring gaps honeycomb structures.

* * * * *